US012580367B2

(12) United States Patent
Chiu

(10) Patent No.: US 12,580,367 B2
(45) Date of Patent: Mar. 17, 2026

(54) ADJUSTABLE PANEL ASSEMBLY AND ELECTRIC APPLIANCE WITH THE SAME

(71) Applicant: NEW WIDETECH INDUSTRIES CO., LTD., New Taipei City (TW)

(72) Inventor: Ming-Tsung Chiu, New Taipei City (TW)

(73) Assignee: NEW WIDETECH INDUSTRIES CO., LTD., New Taipei City (TW)

( * ) Notice: Subject to any disclaimer, the term of this patent is extended or adjusted under 35 U.S.C. 154(b) by 306 days.

(21) Appl. No.: 18/424,038

(22) Filed: Jan. 26, 2024

(65) Prior Publication Data

US 2025/0246878 A1      Jul. 31, 2025

(51) Int. Cl.
H02B 1/044          (2006.01)
F24F 13/20          (2006.01)

(52) U.S. Cl.
CPC ............. H02B 1/044 (2013.01); F24F 13/20 (2013.01)

(58) Field of Classification Search
CPC ....... H02B 1/044; F24F 13/20; H01H 21/245; H01H 21/025; H01H 21/86; H01H 2231/016; H01H 2231/012; H01H 13/023; H01H 13/83; H01H 2219/062; H01H 9/181; H01H 9/161; F25D 23/028;

F25D 23/02; F25D 2323/024; F25D 29/005; F25D 23/04; F25D 2400/06; F25D 2400/36; F25D 2400/361; F25D 27/00
See application file for complete search history.

(56) References Cited

U.S. PATENT DOCUMENTS

| | | | | |
|---|---|---|---|---|
| 8,752,919 B2 * | 6/2014 | Park | ......................... | F25D 29/00 |
| | | | | 312/405.1 |
| 8,960,934 B2 * | 2/2015 | Sung | ..................... | F25D 23/028 |
| | | | | 362/218 |
| 10,871,322 B2 * | 12/2020 | Kim | ....................... | G06F 3/0412 |
| 10,907,884 B1 * | 2/2021 | Scorsim | ................ | F25D 23/028 |
| 2005/0183305 A1 * | 8/2005 | Hirata | ..................... | G09F 13/04 |
| | | | | 40/615 |
| 2006/0016096 A1 * | 1/2006 | Kim | ......................... | D06F 34/34 |
| | | | | 34/524 |
| 2019/0115172 A1 * | 4/2019 | Liao | ........................ | H01H 21/86 |

* cited by examiner

*Primary Examiner* — Ahmed M Saeed
(74) *Attorney, Agent, or Firm* — Withrow + Terranova, PLLC; Vincent K. Gustafson

(57)          ABSTRACT

An electric appliance includes a base, a housing fixed to the base, and a panel assembly pivotably connected to the housing. The panel assembly includes an operating panel set having a pivoting portion and a fastening portion. The pivoting portion is formed at an edge of the operating panel set and is configured to be pivotably connected to the housing of the electric appliance. The fastening portion is configured to selectively fasten to the housing. Since the panel assembly is pivotable relative to the housing, the user can pivot the panel assembly to a suitable angle for convenience of observing the information shown on the panel assembly regardless of the outline of the housing.

7 Claims, 11 Drawing Sheets

20

3122

3122

3121

32  3122

ADJUSTABLE PANEL ASSEMBLY AND ELECTRIC APPLIANCE WITH THE SAME

BACKGROUND OF THE INVENTION

1. Field of the Invention

The present invention relates to an electric appliance and a panel assembly thereof.

2. Description of the Prior Art(s)

A household electric appliance, such as a dehumidifier, is cuboid with a simplistic appearance and therefore suits a variety of interior design styles. The dehumidifier usually has an operating panel that basically has an on/off switch, and further has multiple buttons for switching among various operating modes and multiple indicators for showing parameters and operating conditions. In order to let a user easily read the indicators or information shown on the operating panel, the operating panel is disposed at a top of the electric appliance and directly faces upward. Consequently, it is inconvenient that the user needs to approach the electric appliance and keeps an eye on the top of the electric appliance to see the information on the operating panel.

In view of this, better improvements are needed to remedy the shortcomings.

To overcome the shortcomings, the present invention provides an electric appliance and a panel assembly thereof to mitigate or obviate the aforementioned problems.

SUMMARY OF THE INVENTION

The main objective of the present invention is to provide an electric appliance with a panel assembly which is easily seen and read. The panel assembly is pivotable relative to the electric appliance, whereby the information shown on the panel assembly can be easily observed.

The electric appliance comprises a base, a housing, and a panel assembly. The housing is fixed to the base. The panel assembly is pivotably connected to the housing.

The panel assembly comprises an operating panel set including an emitting portion being capable of emitting various colored lights to represent various conditions of the electric appliance, a pivoting portion located at an edge of the operating panel set and configured to be pivotably connected to the housing of the electric appliance, and a fastening portion configured to selectively fasten to the housing of the electric appliance.

Since the panel assembly is pivotably connected to the housing of the electric appliance via the pivoting portion of the panel assembly, the panel assembly is pivotable relative to the housing. The user can pivot the panel assembly to a suitable angle for conveniently observing the information shown on the panel assembly or the operating panel set regardless of the outline of the housing.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
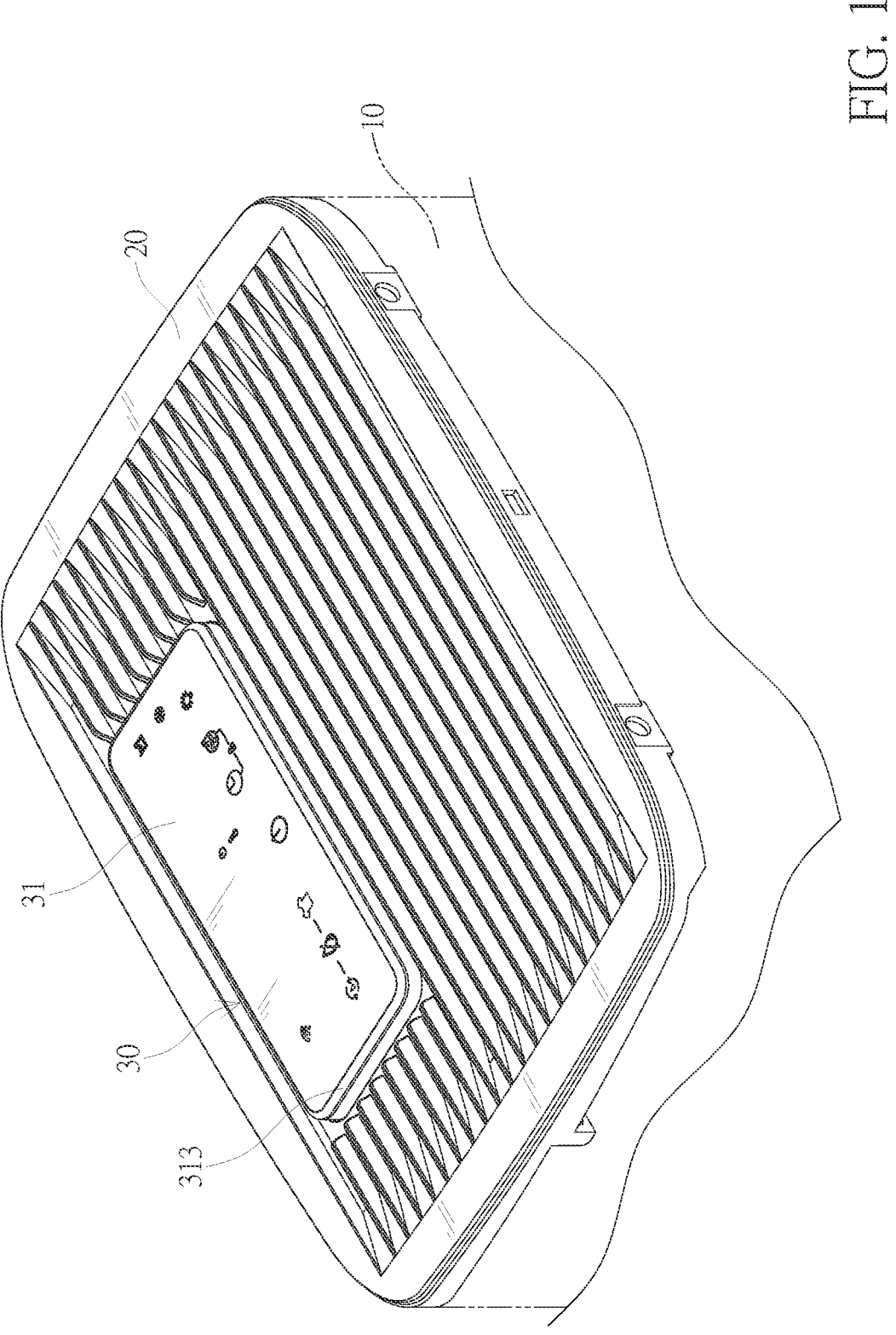
FIG. 1 is an enlarged perspective view of an electric appliance in accordance with the present invention.
Figure 2:
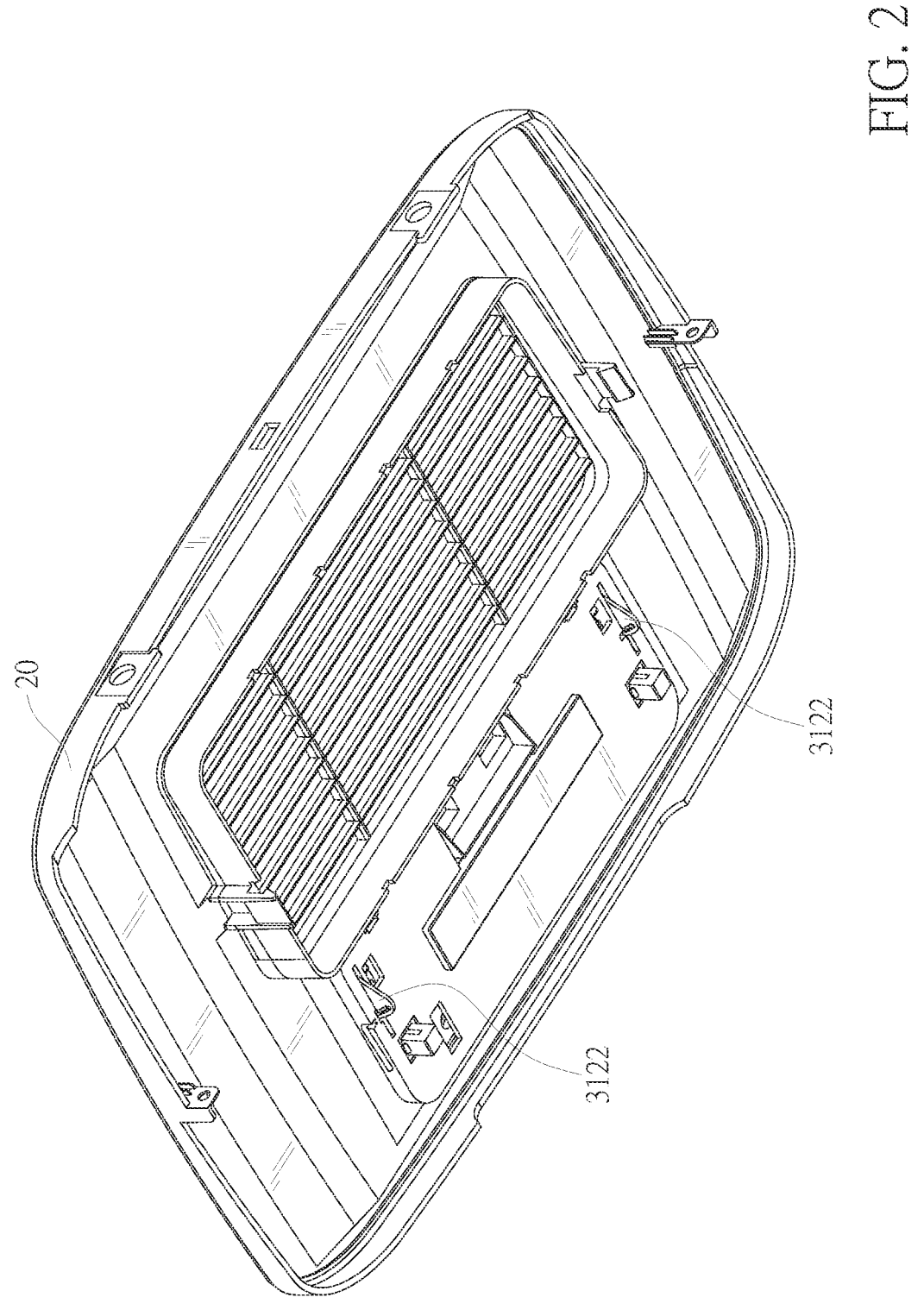
FIG. 2 is a perspective view of an assembly of a panel assembly and a housing of the electric appliance in FIG. 1.

With reference to FIGS. 1 to 4, an electric appliance in accordance with the present invention may be a household electric appliance, e.g. a dehumidifier, an air conditioner, a portable air conditioner, an air purifier, etc., or an electric appliance adapted for factories or manufacturing. The electric appliance in accordance with the present invention comprises a base 10, a housing 20, and a panel assembly 30. The housing 20 is fixed to the base 10. The panel assembly 30 is pivotably connected to the housing 20. The housing 20 includes buckle members 21. Each buckle member 21 has two claws 210 oppositely spaced apart from each other and facing toward each other. In the embodiment, the buckle member 21 is made of a flexible material or rubber and is flexible. In addition, the housing 20 has guiding members 22, each of which may be a protrusion or a rod.

With reference to FIGS. 3 to 6, the panel assembly 30 comprises an operating panel set 31 and elastic members 32. Each elastic member 32 is disposed between the operating panel set 31 and the housing 20 of the electric appliance and is configured to push the operating panel set 31 away from the housing 20 of the electric appliance. In the embodiment, each elastic member 32 may include a torsion spring body and two arms connecting to the torsions spring body. The two arms are able to elastically restore to a specified angle. One of the two arms is connected to the operating panel set 31 and the other one of the two arms is connected to the housing 20. Whereby, the elastic member 32 can push the operating panel set 31 away from the housing 20.

Figure 7:
FIG. 7 is a top view of the electric appliance in FIG. 1.

With reference to FIG. 7, the operating panel set 31 includes a panel body 311, a casing 312, and an emitting portion 313. The panel body 311 is disposed in the casing 312 and may include multiple indicators, e.g., operation on/off indicator, water full indicator, wi-fi connection indicator, fault indicator, thermal protection indicator, and so on. Furthermore, the indicators may represent different conditions via different colored light, steady light, or flashing light. Moreover, the emitting portion 313 is capable of emitting various colored lights to represent various conditions of the electric appliance. In the embodiment, the emitting portion 313 is annular and surrounds the panel body 311; therefore, the emitting portion 313 emits a lighting loop surrounding the panel body 311. A user can easily identify the information conveyed on the operating panel set 31. For example, the emitting portion 313 may emit a blue loop light to represent the appliance operates normally, may emit a red loop light to represent that water level in a tank of a dehumidifier has reached a high level, may emit an orange loop light to represent detection of faults or initiation of thermal protection, may emit a green loop light to represent that the dehumidifier is under a specified mode such as fan mode or dryer mode. Therefore, the emitting portion 313 may emit a loop light varied in different colors, surrounding the panel body 311, and being eye-catching to represent the information of the dehumidifier, so the user can comprehend the working status of the dehumidifier more intuitively.

Figure 3:
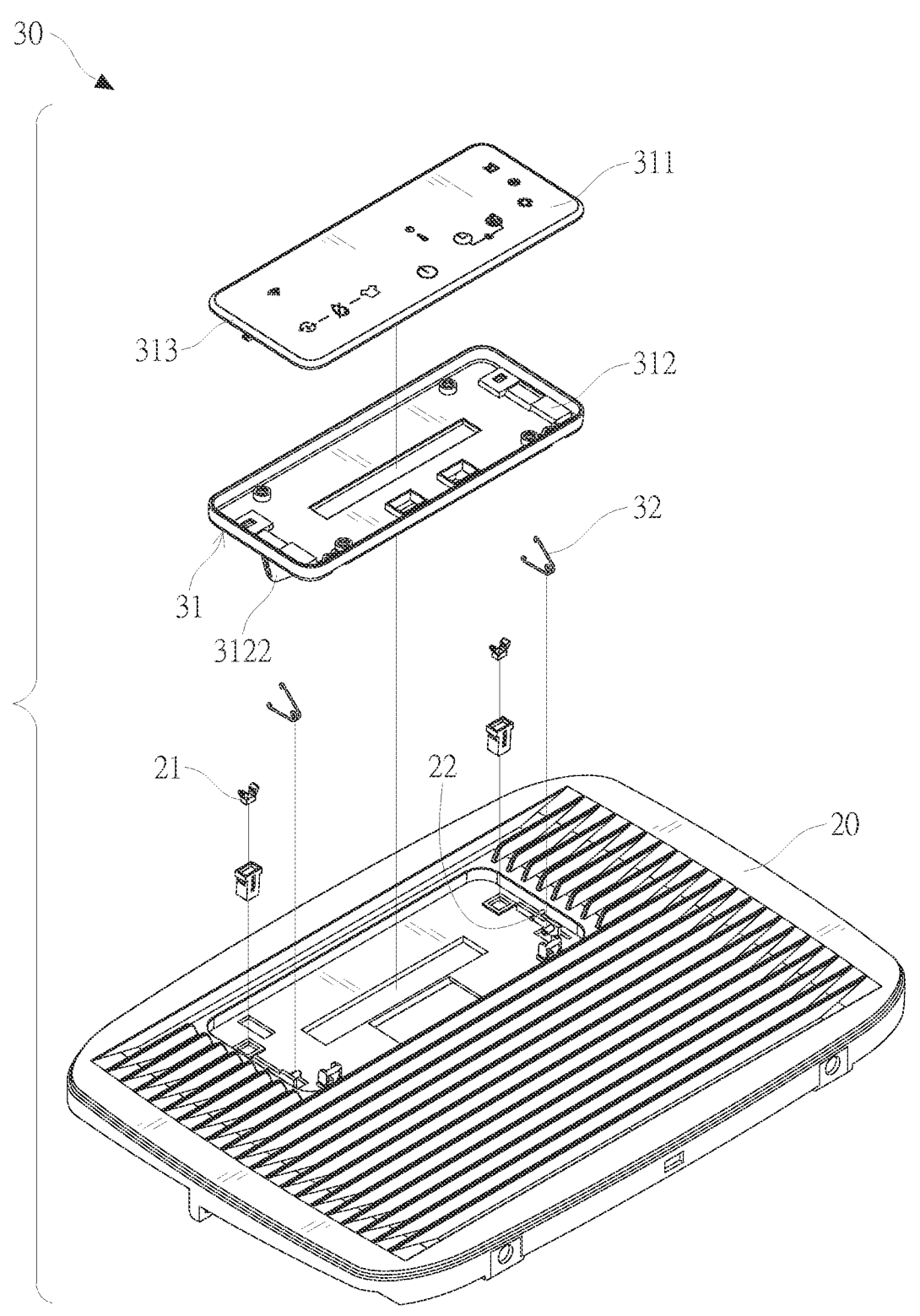
FIG. 3 is an exploded perspective view of the assembly of the panel assembly and the housing in FIG. 2.
Figure 4:
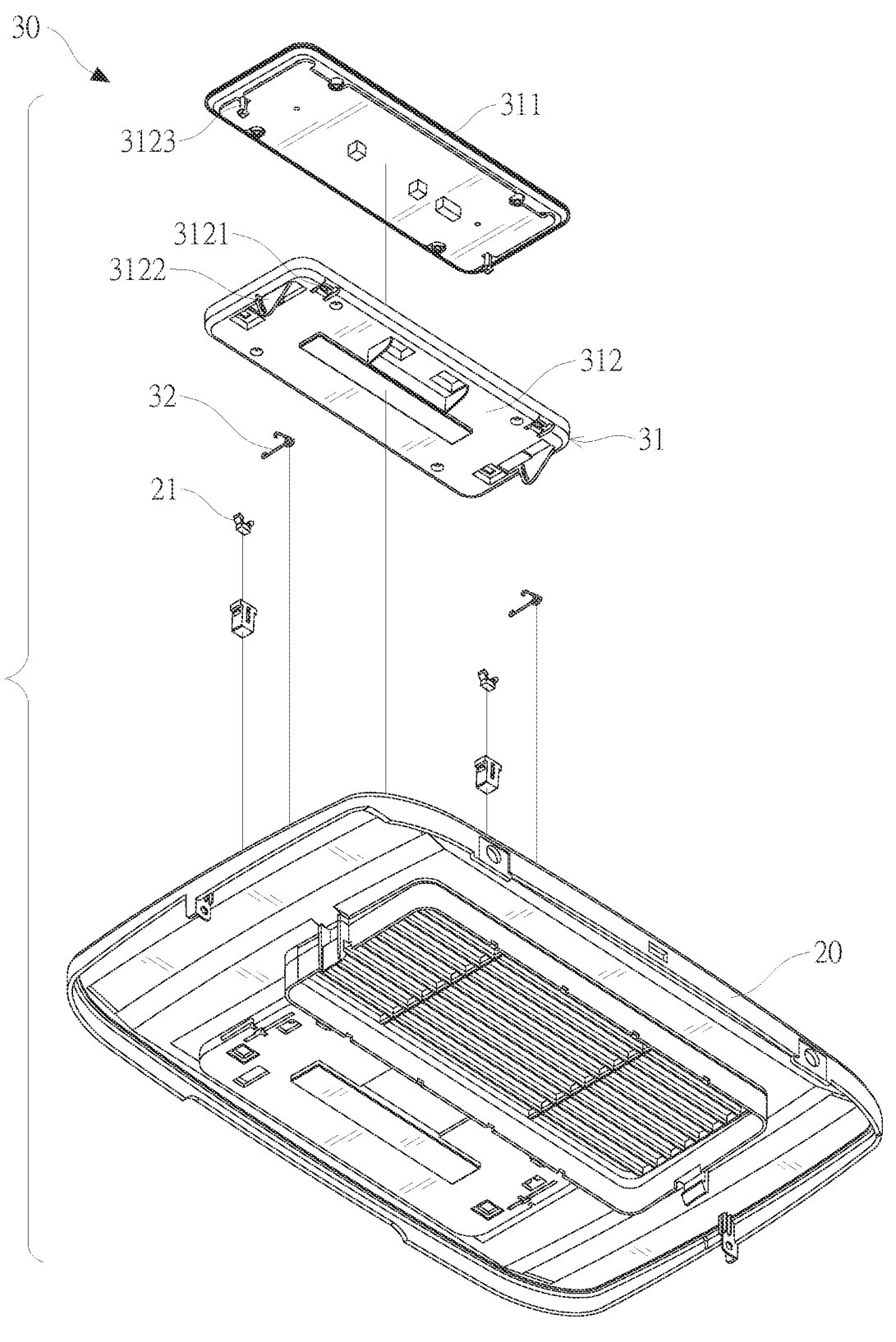
FIG. 4 is another exploded perspective view of the assembly of the panel assembly and the housing in FIG. 1.
Figure 5:
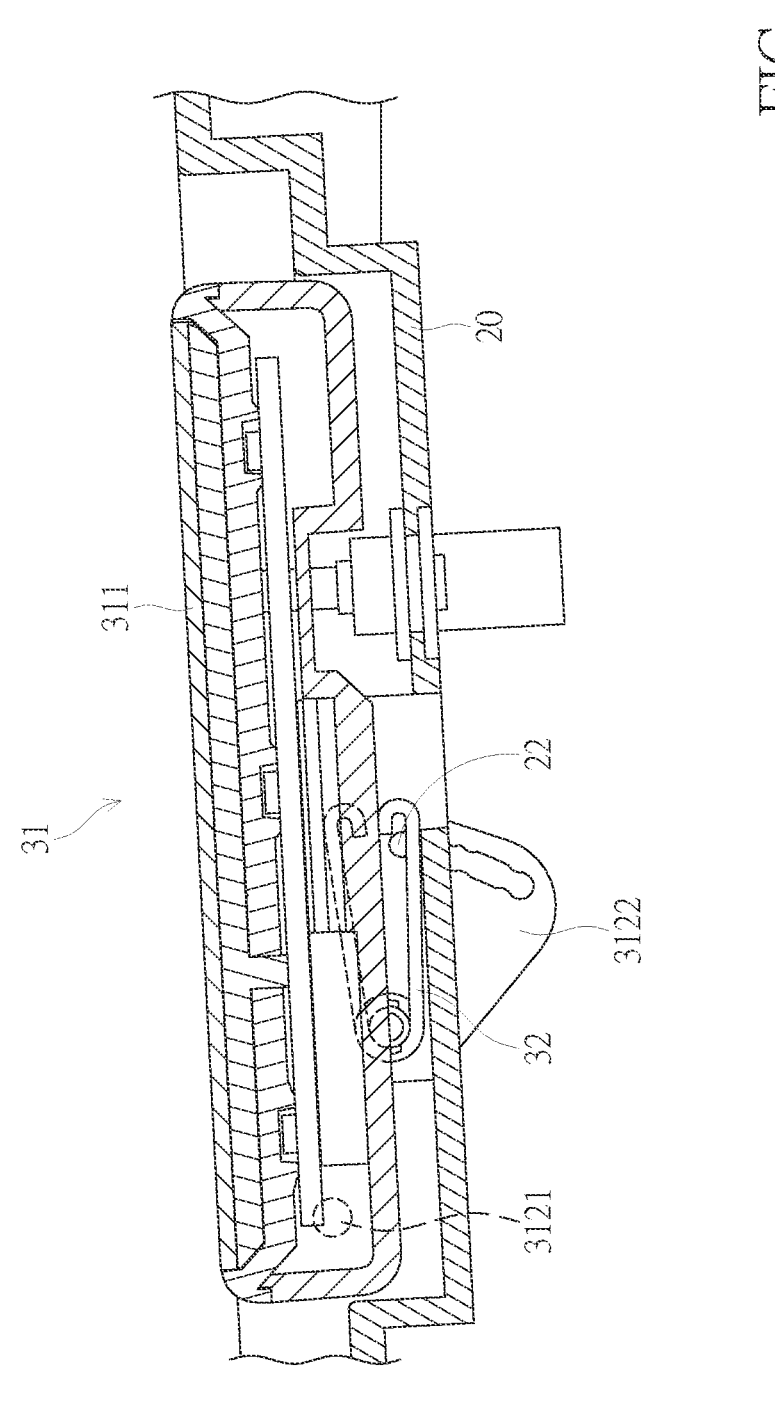
FIG. 5 is an enlarged cross-sectional side view of the electric appliance in FIG. 1, showing that the panel assembly is not pivoted.
Figure 6:
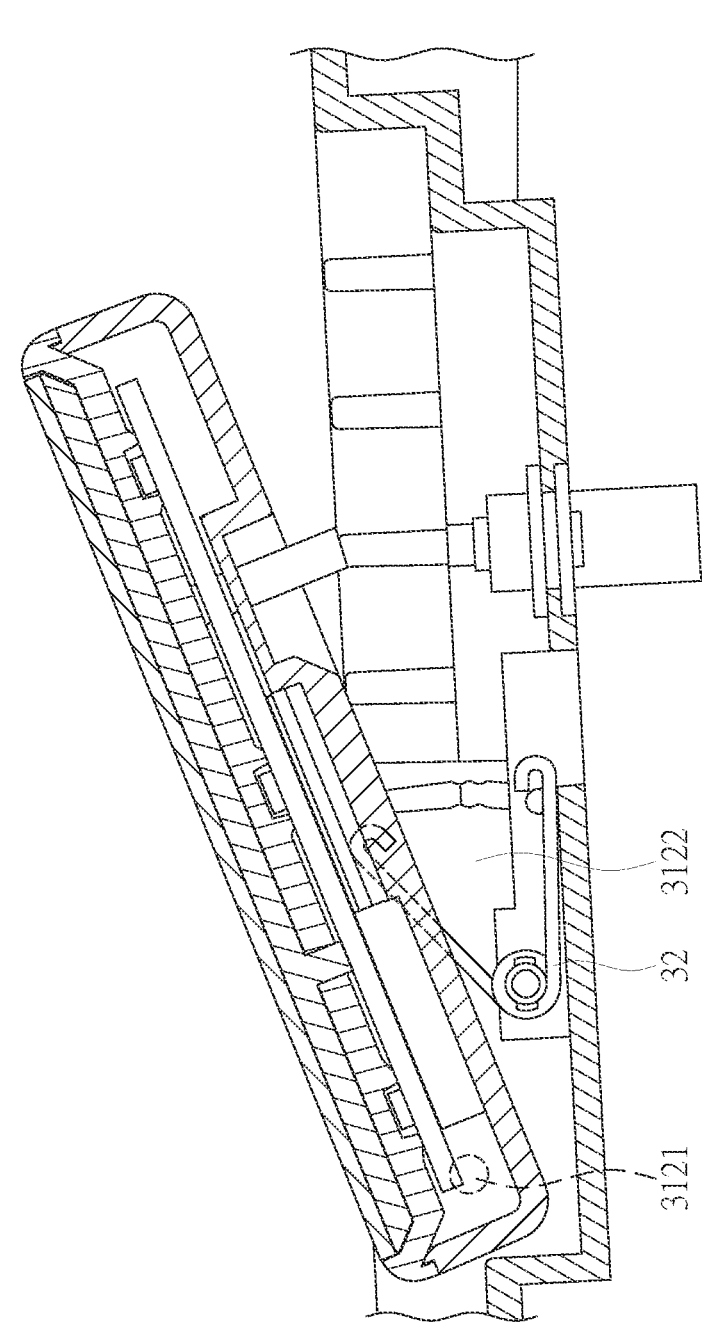
FIG. 6 is an enlarged cross-sectional side view of the electric appliance in FIG. 1, showing that the panel assembly is pivoted.
Figure 6:

With reference to FIGS. 3 and 4, in the embodiment, the casing 312 covers a periphery and a back of the panel body 311. The operating panel set 31 includes pivoting portions 3121, guiding portions 3122, and fastening portions 3123. Said pivoting portions 3121 and said guiding portions 3122 are formed at the casing 312. Said fastening portions 3123 are formed at the panel body 311 and extend through the casing 312. The pivoting portions 3121, the guiding portions 3122, and the fastening portions 3123 are disposed at a side of the casing 312. Each pivoting portion 3121 is configured to be pivotably connected to the housing 20 and is formed at an edge of the casing 312. That is, each pivoting portion 3121 is located at an edge of the whole operating panel set 31. In other words, the operating panel set 31 is pivotable relative to the housing 20 around the pivoting portions 3121.

Figure 8:
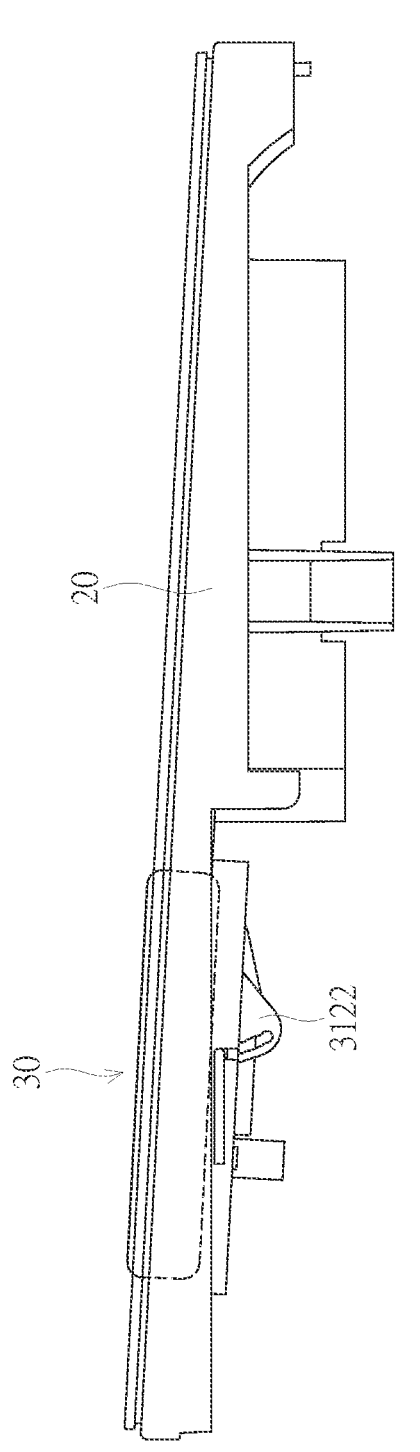
FIG. 8 is a side view of the assembly of the panel assembly and the housing in FIG. 2.
Figure 9:
FIG. 9 is another enlarged cross-sectional side view of the electric appliance in FIG. 1, showing that the panel assembly is not pivoted.
Figure 10:
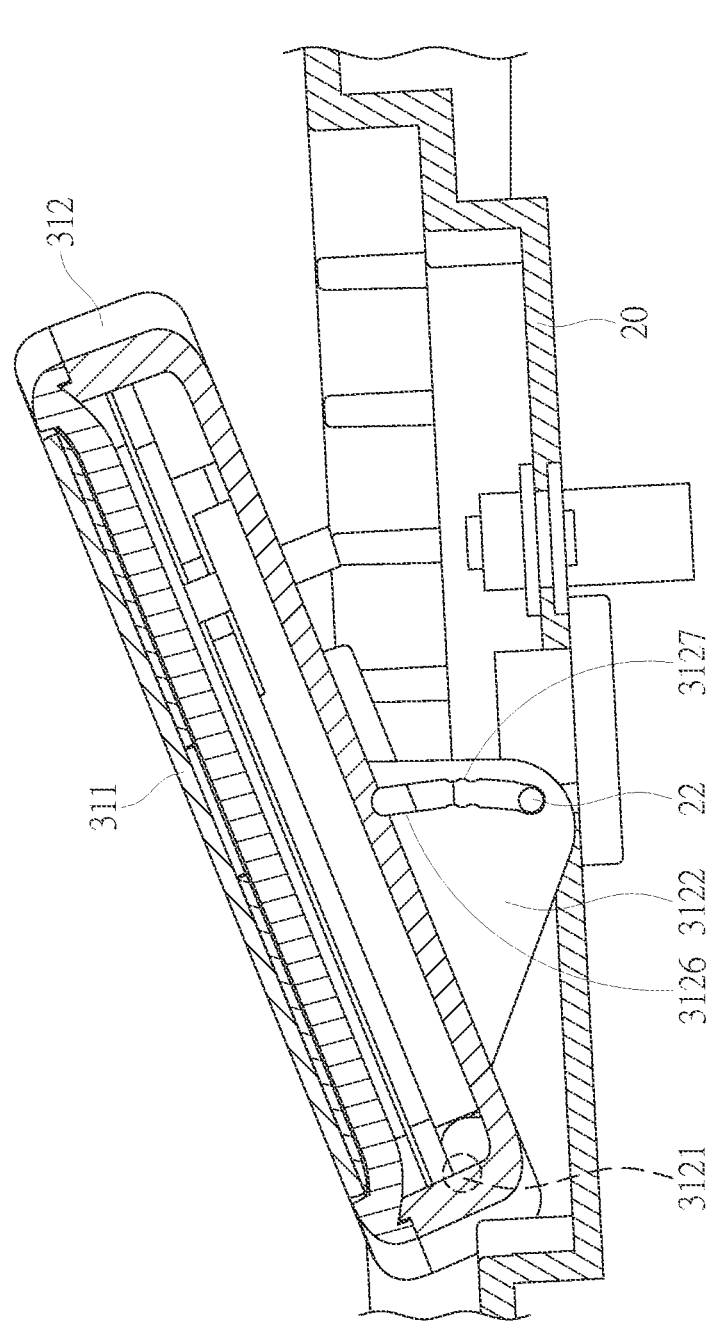
FIG. 10 is another enlarged cross-sectional side view of the electric appliance in FIG. 1, showing that the panel assembly is pivoted.

With reference to FIGS. 8 to 10, each of the guiding portions 3122 is formed at the casing 312 and has an arcuate groove 3126 extending around the pivoting portion 3121. Each guiding member 22 of the housing 20 extends into a corresponding arcuate groove 3126. When the operating panel set 31 pivots relative to the housing 20, the guiding member 22 is moved along the arcuate groove 3126. Whereby the operating panel set 31 can pivot relative to the housing 20 more stably. An engagement edge 3127 is corrugated and is formed along the arcuate groove 3126 to engage with the guiding member 22, whereby the guiding member 22 is selectively blocked by the engagement edge 3127 to be kept in position.

Figure 11:
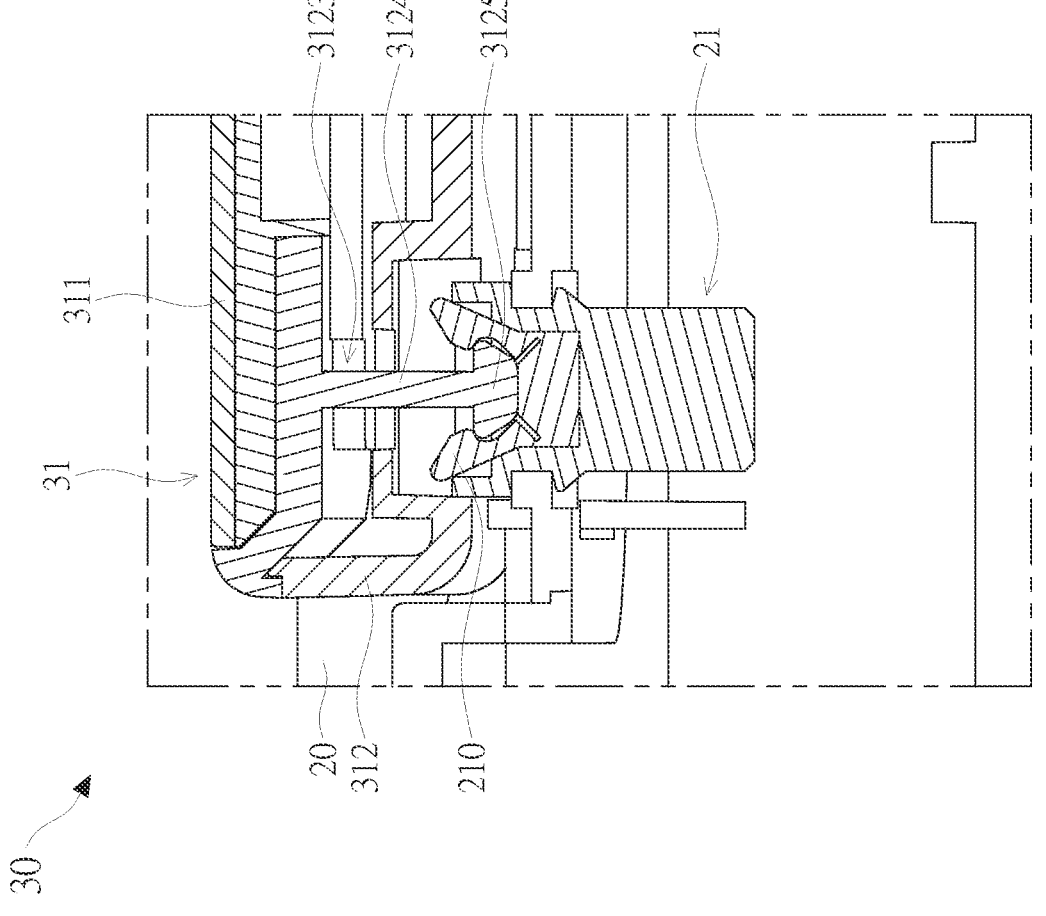
FIG. 11 is an enlarged cross-sectional side view of the electric appliance in FIG. 1, showing engagement of the buckle member and the fastening portion.

With reference to FIG. 11, each fastening portion 3123 is selectively fastened to a corresponding buckle member 21 of the housing 20. In the embodiment, the fastening portion 3123 is disposed at a side of the casing 312 facing away from the panel body 311 and facing toward the housing 20. Specifically, the fastening portion 3123 has a rod body 3124 and a block 3125. The rod body 3124 has two opposite ends, one of the two ends is fixed to a side, of the operating panel set 31, facing toward the housing 20. The block 3125 is formed at the other one of the two ends of the rod body 3124. When the fastening portion 3123 is inserted into the buckle member 21 and between the two claws 210 of the buckle member 21, the two claws 210 respectively engage with opposite sides of the block 3125. Whereby, the operating panel set 31 is kept in position and is not pivotable relative to the housing 20. In the embodiment, since the buckle member 21 is flexible, when the operating panel set 31 is pressed by the user, the fastening portion 3123 is driven to move further to press the buckle member 21, the two claws 210 deform flexibly and no longer engage with the fastening portion 3123. When the operating panel set 31 is no longer pressed, the operating panel set 31 pushed by the elastic member 32 is freed and able to pivot away from the housing 20. In the present application, said buckle member 21, said guiding member 22, said elastic member 32, said pivoting portion 3121, said guiding portion 3122, and said fastening portion 3123 may be respectively implemented as one in amount.

Since the panel assembly 30 is pivotable relative to the housing 20, the user can pivot the panel assembly 30 to a suitable angle for convenience of observing the information shown on the panel assembly 30 or can conveniently operate the operating panel set 31 regardless of the outline of the housing 20.

What is claimed is:

1. A panel assembly adapted to be pivotably connected to a housing of an electric appliance and comprising: an operating panel set including an emitting portion being capable of emitting various colored lights to represent various conditions of the electric appliance; a pivoting portion located at an edge of the operating panel set and configured to be pivotably connected to the housing of the electric appliance; and a fastening portion configured to selectively fasten to the housing of the electric appliance; wherein the operating panel set includes a guiding portion formed at the casing; and the guiding portion has an arcuate groove curvedly extending around the pivoting portion.

2. The panel assembly as claimed in claim 1, wherein the panel assembly comprises an elastic member disposed between the operating panel set and the housing of the electric appliance, and the elastic member is configured to push the operating panel set away from the housing of the electric appliance.

3. The panel assembly as claimed in claim 1, wherein
   the operating panel set includes a casing and a panel body disposed in the casing;
   the pivoting portion and the fastening portion are formed at a side of the casing away from the panel body; and
   the emitting portion surrounds the panel body.

4. An electric appliance comprising: a base; a housing fixed to the base; and a panel assembly pivotably connected to the housing and comprising an operating panel set including an emitting portion being capable of emitting various colored lights to represent various conditions of the electric appliance; a pivoting portion located at an edge of the operating panel set and configured to be pivotably connected to the housing; and fastening portion configured to selectively fasten to the housing; wherein the operating panel set includes a guiding portion formed at the casing; and the guiding portion has an arcuate groove curvedly extending around the pivoting portion.

5. The electric appliance as claimed in claim 4, wherein
   the housing includes a buckle member selectively engaging with the fastening portion of the operating panel set.

6. The electric appliance as claimed in claim 5, wherein
   the fastening portion of the operating panel set includes
      a rod body having two ends, one of the two ends of the rod body fixed to a side of the operating panel set facing toward the housing; and
      a block formed at the other one of the two ends of the rod body;
   the buckle member is flexible and includes two claws oppositely spaced apart from each other and facing toward each other;
   when the fastening portion is inserted into the buckle member and disposed between the two claws of the buckle member, the two claws respectively engage with two sides of the block.

7. The electric appliance as claimed in claim 4, wherein an engagement edge is formed along the arcuate groove, and the guiding member is selectively engaged with the engagement edge.

* * * * *